United States Patent
Roberts et al.

[15] 3,691,085
[45] Sept. 12, 1972

[54] METHOD OF CONTROLLING THE LIFETIME OF OXALATE ESTER CHEMILUMINESCENT REACTIONS

[72] Inventors: Bernard Roberts, Rowayton, Conn. 06853; Michael McKay Rauhut, Norwalk, Conn. 06850

[73] Assignee: American Cyanamid Company, Stamford, Conn.

[22] Filed: July 13, 1970

[21] Appl. No.: 56,198

Related U.S. Application Data

[63] Continuation of Ser. No. 648,932, June 26, 1967, which is a continuation-in-part of Ser. No. 577,615, Sept. 7, 1966, abandoned.

[52] U.S. Cl...............................252/188.3, 252/186
[51] Int. Cl...............................................C09k 3/00
[58] Field of Search..................252/186, 188.3, 301.2

[56] References Cited

UNITED STATES PATENTS

2,420,286    5/1947    Lacey et al.............252/188.3

*Primary Examiner*—John D. Welsh
*Attorney*—Charles J. Fickey

[57] ABSTRACT

A novel chemiluminescent composition which incorporates at least one of a newly discovered group of materials which extend the lifetime during which an oxalic ester chemiluminescent reaction produces chemiluminescent light. The lifetime extender materials are inorganic and organic acids which have a pKa below about 5.0 in aqueous solution. Also useful are sulfates of lithium and metals from Groups 2a, 2b, and 3a of the Periodic Table, chlorides of Group 2a metals, silica, and acidic ion exchange resins.

11 Claims, No Drawings

METHOD OF CONTROLLING THE LIFETIME OF OXALATE ESTER CHEMILUMINESCENT REACTIONS

This application is a continuation of application Ser. No. 648,932, filed June 26, 1967, which application is a continuation-in-part of application Ser. No. 577,615, filed Sept. 7, 1966, now abandoned.

This invention relates to a novel chemiluminescent composition which incorporates at least one of a newly discovered group of materials which extend the lifetime during which an oxalic ester chemiluminescent reaction produces chemiluminescent light. By the term "chemiluminescent light" as referred to herein is meant electromagnetic radiation at wavelength falling between about 350 m$\mu$ and 1,000 m$\mu$.

In copending, commonly assigned application, Ser. No. 491,896, filed Sept. 30, 1965 which was abandoned as of Mar. 1, 1967, and refiled as Ser. No. 619,140 now U.S. Pat. No. 3,597,362, on Feb. 28, 1967, oxalic-type esters were disclosed in combination with a "regulator" to "control" or "affect" the rate of reaction of a hydroperoxide with the oxalic-type ester, to produce chemiluminescent light. Application Ser. No. 491,896, was directed to the acceleration of a reaction, whereby an oxalic-type ester having a long lifetime and having merely a moderate or a low quantum yield of chemiluminescent light or maximum intensity of chemiluminescent light might be accelerated to a much shorter chemiluminescent light-producing life at a much higher quantum yield and at a much higher maximum intensity. In contrast thereto, the present invention is directed to the employment of a material which is preferably used in conjunction with a chemiluminescent system characterized by a very short lifetime of production of chemiluminescent light.

Accordingly, it is an object of this invention to obtain a chemiluminescent oxalic-type ester composition including at least one decelerating agent.

Another object is to produce a process whereby the rate of reaction of an oxalic-type ester chemiluminescent system may be decelerated sufficiently to prolong the lifetime for the production of chemiluminescent light.

Another object is to obtain a "buffered" chemiluminescent system characterized by increased stability in the rate of reaction whereby the rate of reaction is less sensitive to the presence of one or more of miscellaneous contaminants which otherwise might adversely change the rate of reaction.

Other objects become apparent from the above and following disclosure.

The term "chemiluminescent composition," as used herein, means a mixture of all the ingredients which will result in a reaction to produce chemiluminescence.

The term "chemiluminescent reaction component," as used herein, means a mixture which will result in a chemiluminescent reaction when reacted with other necessary reactants in the processes as disclosed herein.

The term "fluorescent compound," as used herein, means a compound which fluoresces in a chemiluminescent reaction, or a compound which produces a fluorescent compound in a chemiluminescent reaction.

The term "peroxide compound," as used herein, also includes compounds which upon reaction produce the peroxide group.

The term "hydrogen peroxide compound" includes (1) hydrogen peroxide and (2) hydrogen peroxide-producing compounds.

The term "hydroperoxide compound," as used herein, is limited to peroxide compounds having at least one HOO— group, or a compound which upon reaction produces a compound with such a group.

The term "peroxidic groups," as used herein, represents HOO—, ROO—, or

R is a substituent such as alkyl, cycloalkyl, $\alpha$-hydroalkyl, substituted alkyl, for example, and $R^1$ may be R or an aromatic radical.

The term "diluent," as used herein, means a solvent or a vehicle which when employed with a solvent does not cause insolubility.

The term "admixing," as used herein, means "reacting" or sufficiently bringing together component reactants to obtain a chemiluminescent reaction.

We have unexpectedly discovered that the objects of this invention are obtained by admixing [A] (1) an oxalic-type ester such as an oxalic acid ester or a keto compound of the typical oxalic acid ester structure (as described fully below), (2) a hydroperoxide, (3) a fluorescent compound, and (4) a diluent, and [B] a decelerator catalyst (i.e. a lifetime extender agent). Inorganic and organic acids are useful which have a pKa below about 5.0 in aqueous solutions. Suitable organic acids are, for example, $\alpha$-hydroxy acids, such as glycolic acid, lactic acid, tartaric acid, hydroxy malonic acid, and benzilic acid; trifluoro-substituted and dichloro-substituted acetic acids, and dicarboxylic acids including oxalic acid, malonic acid, succinic acid, glutaric acid, adipic acid, sebacic acid, fumaric acid, phthalic acid, and the dicarboxy pyridine acids such as 2,4- and 2,5-, and 2,6-, and 2,3-, and 3,4- and 3,5-pyridine dicarboxylic acid, and other organic acids. Also useful are sulfates of lithium and metals from Groups 2a, 2b, and 3a of the Periodic Table; chlorides of Groups 2a metals; silica, and acidic ion exchange resins.

Representative lifetime extenders or reaction decelerators are shown in Tables A and B.

In Table B is shown the pKa values for a number of representative acids and the decelerating effect of the acids on the chemiluminescent reaction. Table B shows the relationship of the acidic strength of a soluble, acidic lifetime extender to the effectiveness of the extender. Thus very small concentrations of strong acids (on the order of $10^{-5}$ molar) such as sulfuric acid are effective, whereas larger concentrations (up to 50 percent by volume) of weak acids, such as acetic acid, are normally required.

TABLE A

Representative Lifetime Extender Compounds

| Preferred Lifetime Extenders | Other active Lifetime Extenders |
|---|---|
| magnesium sulfate | barium sulfate |
| phosphoric acid | magnesium chloride |
| methane sulfonic acid | dimethyl glyoxime |
| sulfuric acid | barium chloride |
| phthalic acid | sodium sulfate |
| silica | glycolic acid | tartaric acid
trifluoroacetic acid
dichloroacetic acid
lactic acid
malonic acid
aluminum sulfate
zinc sulfate
lithium sulfate hydroxy malonic acid
benzylic acid
cadmium sulfate
calcium chloride
barium perchlorate
succinic acid
glutaric acid
sebasic acid
fumaric acid
hydrochloric acid
nitric acid

TABLE B pKa Value of Representative Acids and Their Effect on the Chemiluminescent Reaction

| No. | Compound | pKa | Relative Effect |
|---|---|---|---|
| 1 | sulfonic acid | 1.92 | large |
| 2 | methane sulfonic acid | strong | large |
| 3 | phosphoric acid | 2.12 | large |
| 4 | tartaric acid | 2.98 | large |
| 5 | oxalic acid | 1.23 | large |
| 6 | trifluoroacetic acid | 0.23 | large |
| 7 | quniolinic acid | 2.52 | moderate |
| 8 | benzoic acid | 4.19 | small |
| 9 | o-chlorobenzoic acid | 2.92 | small |
| 10 | phthalic acid | 2.98 | large |
| 11 | acetic acid | 4.75 | small |
| 12 | dichloroacetic acid | 1.48 | large |
| 13 | lactic acid | 3.08 | large |
| 14 | adipic acid | 4.43 | moderate |
| 15 | malonic acid | 2.83 | large |
| 16 | citric acid | 3.08 | small |

The ester suitable for use in applicant's invention includes any one or more of the oxalic-type esters set forth in U.S. Ser. No. 491,896, filed Sept. 30, 1965, the entire disclosure of which is hereby incorporated by reference.

More specifically, the esters suitable for use in the present invention include compounds of the oxalic-type having the typical formula $R^1OCO(CO)_nOR^{11}$, in which n is at least 1 and in which $R^1$ and $R^{11}$ may be any aliphatic or aromatic groups, including halogen or aromatically substituted compounds. To obtain the optimal and preferred results of this invention, it is critical that the ester reactant be selected from the group consisting of (1) an ester of an alcohol characterized by an acid ionization constant in water greater than $1.3 \times 10^{-10}$, and (2) a vinyl ester of an oxalic-type acid of the above structural formula. It should be noted that the above acid ionization constant (in water) may be stated in terms of the Hammett Sigma Value of an unsubstituted or substituted alcohol (conventionally aromatic alcohols), whereby the Hammett Sigma Value would be greater (positive) than zero for the substituent of a substituted alcohol which is characterized by an acid ionization constant greater than $1.3 \times 10^{-10}$.

Typical organic oxalic-type esters which may be employed are esters such as:

Esters of the following types:

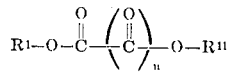

where $R^1$ or $R^{11}$ are:

I. Aryl groups: e.g., phenyl; or substituted aryl groups by typical substituents such as 2,4,6-trichlorophenyl, pentachlorophenyl oxalate, chlorophenyl, benzoylxyphenyl, formylphenyl, carboxyphenyl, methoxyphenyl, acetylaminophenyl, pyridylphenyl, sulfophenyl.

II. Heterocyclic groups: e.g., pyridyl, or substituted heterocyclic groups by typical substituents such as methylpyridyl, chloropyridyl, acetoxypyridyl, formylpyridyl, carboxypyridyl, methoxyfuryl, dimethylaminohydrofuryl, sulfofuryl; and III. Unsaturated alkyl groups: e.g., vinyl.

Of the above esters of oxalic-type acids the electronegatively substituted aryl oxalate esters obtain the preferred high light intensities of this invention. Included in the group of vinyl oxalic-type esters are (1) the unsubstituted, (2) the substituted, and (3) the cyclic vinyl esters of the above identified formula. Typical substituted vinyl esters include bis(2-propenyl)oxalate, bis(2-octenyl)oxalate, bis(1-phenyl)vinyl oxalate, and the like. Typical cyclic vinyl esters include 1-cyclohexenyl oxalate, 1-cyclooctenyl oxalate, and the like.

The peroxide employed in the compositions and process of this invention may be obtained from any suitable peroxide compound. For example, the peroxide may be employed as sodium peroxide. Alternatively, sodium peroxide may be placed in aqueous solution whereby a solution of hydrogen peroxide is obtained. Obviously, hydrogen peroxide or its solution may be employed. Although the presence of water and/or base is critical in order to obtain the preferred optimum maximum intensity chemiluminescence in certain embodiments of this invention, the peroxide employed may be obtained from anhydrous hydrogen peroxide compounds such as perhydrate or urea (urea peroxide), perhydrate of pyrophosphate (sodium pyrophosphate peroxide), pyrohydrate of histidine (histidine peroxide), sodium perborate, and the like. Still another form in which the anhydrous $H_2O_2$ may be provided in the composition is that of an anhydrous solution of $H_2O_2$ in a suitable solvent such as an ether, an ester, an aromatic hydrocarbon, etc., of the type which would provide a suitable diluent for the composition of this invention. Whenever hydrogen peroxide is contemplated to be employed, any suitable compound may be substituted which will produce hydrogen peroxide.

The peroxide concentration may range from about 15 molar down to about $10^{-5}$, preferably about 2 molar down to about $10^{-3}$ molar. The ester of this invention may be added as a solid or in admixture with a suitable solid peroxide reactant or in a suitable diluent, or alternatively dissolved directly in a solution containing the peroxide reactant.

Typical diluents within the purview of the instant discovery are those that do not readily react with a peroxide, such as hydrogen peroxide, and which do not readily react with an ester of oxalic acid.

Although the addition of water is not necessary for the production of chemiluminescent light in certain embodiments according to the present invention, water can serve as the diluent or partial diluent. In addition, however, either one or more diluents may be included with or in the place of the water, as long as the peroxide employed is at least partially soluble in the diluent(s), such as, for example, at least one gram of $H_2O_2$ per liter of diluent. The following are illustrative of the additional diluents or solvents which may be employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like, including combinations of more than one solvent.

The fluorescent compounds contemplated herein are numerous; and they may be defined broadly as those which do not readily react on contact with the peroxide employed in this invention, such as hydrogen peroxide; likewise, they do not readily react on contact with the ester of oxalic acid. Typical suitable fluorescent compounds for use in the present invention are those which have a spectral emission falling between 330 millimicrons and 1,000 millimicrons and which are at least partially soluble in any of the above diluents, if such diluent is employed. Among these are the conjugated polycyclic aromatic compounds having at least 3 fused rings, such as anthracene, substituted anthracene, benzanthracene, penanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Particularly effective as fluorescers are rubrene and 9,10-bis(phenylethynyl)anthracene as disclosed in copending, commonly assigned application Ser. Nos. 577,596 and 614,401, respectively.

Numerous other fluorescent compounds having the properties given hereinabove are well known in the art. Many of these are fully described in "Fluorescence and Phosphorescence," by Peter Pringsheim, Interscience Publishers, Inc., New York, N.Y., 1949. Other fluorescers are described in "The Colour Index," Second Edition, Volume 2, The American Association of Textile Chemists and Colorists, 1956, pp. 2,907–2,923. While only typical fluorescent compounds are listed hereinabove, the person skilled in the art is fully aware of the fact that this invention is not so restricted and that numerous other fluorescent compounds having similar properties are contemplated for use herein.

It whould be noted, however, that although a fluorescent compound is necessary to obtain the production of light, the fluorescent compound is not necessary to obtain a chemical energy release. Also, a fluorescent ester such as the oxalic acid ester of 2-naphthol-3,6,8-trisulfonic acid does not require a separate fluorescent compound to obtain light. Other typical fluorescent oxalic acid esters include esters of oxalic acid (1) 2-carboxyphenol, (2) 2-carboxy-6-hydroxyphenol, (3) 1,4-dihydroxy-9,10-diphenylanthracene, and (4) 2-naphthol. Thus, a reactant including a fluorescent oxalic-type ester would thereby include at least one fluorescent compound.

It has been found that the molar (moles per liter of diluent) concentrations of the major components of the novel composition herein described may vary considerably. It is only necessary that components be in sufficient concentration to obtain chemiluminescence. The ester of oxalic acid molar concentration normally is in the range of at least about $10^{-7}$ to 5 molar, preferably in the range of at least about $10^{-4}$ to about 1 molar; the fluorescent compound is present in the range from about $10^{-5}$ to 5, preferably $10^{-4}$ to $10^{-1}$ molar; and the water or other diluent must be present in a sufficient amount to form at least a partial solution of the reactants involved in the chemiluminescent reaction. There is no known maximum limit on the concentration of ester employed in the reaction. The ester may serve as either the sole diluent or a partial diluent.

The ingredients of the composition of this invention may be admixed in a single stage of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a composition which includes an oxalic acid ester, a decelerator agent, and a fluorescent compound but which does not include a peroxide compound. Another alternative composition would be a composition which includes the fluorescent compound, a decelerator agent, and a peroxide, but which does not include the oxalic acid ester. Another alternative composition would be a solid composition which includes a solid decelerator catalyst, a solid oxalic-type ester and a solid hydroperoxide compound, and possibly additionally includes a solid fluorescent compound, but which does not include a diluent. Obviously the preferred compositions which would be less than all necessary components to produce a chemiluminescent light would be a composition which would be substantially stable to a practical degree over an extended period of time; otherwise, there would be no real advantage in forming a chemiluminescent reactant to be employed in a subsequent chemiluminescent reaction.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about −40° and 75° C, preferably between about 20° and 50° C; however, the luminescence of applicants' process is not limited to these ranges. However, temperature is not critical.

The lifetime and the intensity of the chemiluminescent light can be regulated and/or buffered by the use of one or more decelerator catalysts of this invention in combination with the use of certain regulators such as:

1. By the addition of base to the chemiluminescent composition. Both the strength and the concentration of the base are critical for purposes of regulation. The conjugate bases of the carboxylic acid lifetime extenders of this invention are particularly effective as buffer additives.
2. By the variation of hydroperoxide. Both the type and the concentration of hydroperoxide are critical for the purposes of regulation.
3. By the addition of water.
4. By the addition of a catalyst which accelerates the rate of reaction of hydroperoxide with the oxalic-type ester.

Catalysts which are accelerators are disclosed in copending, commonly assigned application, Ser. No. 577,595, filed Sept. 7, 1966, and include those described in M. L. Bender, "Chem. Revs.," Vol. 60, p. 53 (1960).

The rate can be regulated as might be desired for any particular situation with the present invention.

The following examples are intended to illustrate the present invention and are in no way intended to limit the invention except as limited in the appended claims.

EXAMPLE I

The purpose of this example is to illustrate the effect of the additives of this invention on chemiluminescence obtained from the reaction of ingredients which include bis(2,4-dinitrophenyl)oxalate, hydrogen peroxide, and rubrene. The reactions each employ 0.010 molar bis(2,4-dinitrophenyl)-oxalate [DNPO], 0.048 molar hydrogen peroxide, and $6.45 \times 10^{-4}$ molar rubrene in dimethylphthalate at about 25° C. The time required for three-quarters of total light emission is referred to in the column of Table I as T ¾. The intensity is expressed in terms of maximum intensity and is referred to in Table I as "$I_{(max)}$" and is expressed in terms of foot lamberts. This intensity is the intensity when employing a one cm depth; the intensity of a chemiluminescent solution is a function of the solution depth behind the visible surface, increasing with increasing depth.

The evaluation of the experiments of this Example I was carried out by using a radiometer-spectrophotometer.

It should be noted, that the additives tested in this Example I are characterized by the property of being either insoluble or partially soluble in the reaction mixture described above.

The results of Example I are shown in Table I below.

TABLE I

| Additive | Mg/3 ml of sample | T ¾ (min.) | $I_{(max)}$ (foot lamberts) | Quantum Yield (einsteins mole$^{-1}$ × 1$^{-2}$) | Radiation Capacity (einsteins 1$^{-2}$×10$^{-1}$) |
|---|---|---|---|---|---|
| none | none | 1.7–2.2* | 215.0* | 16.7* | 16.7* |
| Barium sulfate | 5 | 4.3 | 227.6 | 18.1 | 18.1 |
| Barium sulfate | 1 | 2.0 | 270.3 | 17.9 | 17.9 |
| Lithium Perchlorate | 5 | 9.4 | 1–11 | 0.5 | 0.5 |
| Lithium Perchlorate | 1 | 10.5 | 1.3 | 0.5 | 0.5 |
| Magnesium Chloride (MgCl$_2$·6H$_2$O) | 5 | 3.2 | 200.0 | 16.2 | 16.2 |
| Magnesium Chloride (MgCl$_2$·6H$_2$O) | 1 | 1.9 | 242.4 | 16.4 | 16.4 |
| Sodium Chloride | 5 | 1.7 | 230.0 | 15.4 | 15.4 |
| Sodium Chloride | 1 | 1.7 | 233.0 | 15.0 | 15.0 |

*The value is an average of several "control" runs.

It should be noted that barium sulfate as an additive appears to have a much greater effect when employed in larger quantities. It should also be noted, however, that the employment of barium sulfate in small quantities obtains a large increase in the maximum intensity, and also obtains a small but significant increase in the quantum yield. However, when the barium sulfate is employed in the higher quantities, not only is it effective as a decelerator, but concurrently there is obtained a further moderate increase in the quantum yield.

The lithium perchlorate additive appears to be approximately equal in its decelerating action whether employed in small or large amounts, and significantly reduces both the maximum intensity and the quantum yield.

The magnesium chloride (MgCl$_2$·6H$_2$O) appears to increase in its effectiveness as a decelerator as the quantity employed increases.

EXAMPLE II

This example is carried out with 0.010 molar bis(2,4-dinitrophenyl)oxalate, $6.0 \times 10^{-4}$ molar 9,10-diphenylanthracene, and 0.041 molar anhydrous hydrogen peroxide (dried by shaking with anhydrous magnesium sulfate at 10 molar hydrogen peroxide concentration) in dimethyl phthalate solution at about 25° C. The lifetime of the reaction was measured in terms of T ¼, the time required for the intensity to decrease to one-quarter of the maximum intensity as contrasted to the preceding example in which T ¾ was employed. The additives of this example, similar to Example I, are characterized by insolubility in the reaction mixture described above. The results of Example II are illustrated in Table II below.

TABLE II

| Additive | Mg/3 ml of sample | T ¼ (min.) | Quantum Yield (einsteins mole$^{-1}$×10$^{-2}$) |
|---|---|---|---|
| None | None* | 36.1* | 7.93* |
| Magnesium sulfate (finely divided) | 1.5 | 233.0 | 7.42 |
| SiO$_2$ (finely divided) | 0.5 | 51.0 | 7.71 |

*The value is an average of several "control" runs.

Table II illustrates that magnesium sulfate at small concentrations obtains a high degree of effectiveness as a decelerator, while concurrently having only a minor effect in the reduction of quantum yield, and that silica at very low concentration is effective as a decelerator and also has a very minor effect in the reduction of quantum yield.

EXAMPLE III

Example III is carried out in a manner similar to that of Example I with the exception that soluble additives are employed.

TABLE III

| Additive | Concentration (mole $l^{-1}$) | T ¾ (min.) | $I_{(max.)}$ (foot lamberts) | Quantum Yield (einsteins moles$^{-1}$ ×$10^{-2}$) | Radiation Capacity (einstein $l^{-1}$×$10^{-2}$) |
|---|---|---|---|---|---|
| None | None* | 2.2* | 215.0* | 16.7* | 16.7* |
| d-tartaric acid | 5×$10^{-3}$ | 63.0 | 4.5 | 13.6 | 13.6 |
| d-tartaric acid | 2.5×$10^{-3}$ | 57.6 | 6.6 | 13.6 | 13.6 |
| d-tartaric acid | 5×$10^{-4}$ | 33.3 | 7.9 | 13.0 | 13.0 |
| trifluoro-acid | 5×$10^{-4}$ | 101.7 | 1.91 | 10.6 | 10.6 |
| qinolinic acid** | 5×$10^{-3}$ | 6.7 | 96.4 | 19.1 | 19.1 |
| qinolinic acid** | 2.5×$10^{-3}$ | 6.9 | 147.1 | 15.6 | 15.6 |
| dipicolinic acid** | 5×$10^{-3}$ | 3.9 | 164.2 | 17.4 | 17.4 |
| dipicolinic acid** | 2.5×$10^{-3}$ | 3.7 | 171.4 | 16.2 | 16.2 |
| dimethyl-glyoxime | 5×$10^{-3}$ | 8.5 | 199.2 | 15.6 | 15.6 |
| dimethyl-glyoxime | 2.5×$10^{-3}$ | 4.0 | 220.7 | 16.2 | 16.2 |
| oxalic acid·$2H_2O$ | 2.5×$10^{-4}$ | 95.7 | 2.2 | 12.3 | 12.3 |
| acetic acid | 5×$10^{-3}$ | 2.3 | 195.0 | 16.1 | 16.1 |

*This value is an average of several "control" runs.
**pyridine-2,3-dicarbonylic acid
***pyridine-2,6-dicarbonylic acid.

The results in Table III illustrate that d-tartaric acid is effective as a decelerator at varying concentrations, becoming progressively less effective at lower concentrations. It should be noted, however, that although the lower concentrations of the d-tartaric acid has a detrimental effect in decreasing the quantum yield when the tartaric acid is employed in a higher concentration, the quantum yield does not have any further decrease.

The quinolinic acid is effective as a decelerator to approximate the same degree in both high and low concentrations, but at the higher concentrations, such as 5 × $10^{-3}$ mole $l^{-1}$, the quinolinic acid serves to increase the quantum yield, and at both low and high concentrations tends to decrease the maximum intensity.

Similarly, the dipicolinic acid is effective at both high and lower concentrations as a decelerator and as a decreasor of the maximum intensity.

Dimethylglyoxime is more effective in the higher concentrations as a decelerator, and also at a higher concentration the maximum intensity appears to decrease.

Oxalic acid is disclosed in the table as being highly effective as a decelerator at a very low concentration and with a moderate reduction in quantum yield, while concurrently the maximum intensity is maintained at a sufficiently high level to be of practical value.

The acetic acid at this concentration appeared to have no significant effect as a decelerator and also had no significant effect on the maximum intensity and the quantum yield. However, at higher concentrations, acetic acid is effective as illustrated in subsequent Example VII.

In contrast thereto, the trifluoroacetic acid is highly effective as a decelerator and also causes substantial reduction in maximum intensity and quantum yield.

EXAMPLE IV

This example was carried out in a manner similar to that of Example II with the exception that 0.062 molar hydrogen peroxide (prepared from 98 percent hydrogen peroxide without drying) was employed in substitution for the 0.041 molar anhydrous hydrogen peroxide of Example II. In this example oxalic acid (anhydrous) was employed at varying concentrations to illustrate the effect of concentration on oxalic acid as an additive of this invention.

TABLE IV

| Additive | Concentration (mole $l^{-1}$) | T ¼ (min.) | Quantum Yield (einsteins mole × $10^{-2}$) |
|---|---|---|---|
| None | None* | 2.8* | 7.93* |
| oxalic acid (anhydrous) | 1×$10^{-5}$ | 8.5 | 6.75 |
| oxalic acid (anhydrous) | 1×$10^{-4}$ | 114.7 | 6.33 |
| oxalic acid (anhydrous) | 1×$10^{-3}$ | 333.3 | 6.81 |
| oxalic acid (anhydrous) | 1×$10^{-2}$ | 710.4 | 4.91 |

*This value is an average of several "control" runs.

Table IV illustrates that oxalic acid is highly effective as a decelerator, and that the degree of deceleration of the reaction is directly proportional to the concentration, deceleration becoming greater as the concentration of the decelerator increases. The Table IV also illustrates that although the time of ¼ life may be extended to 710.4 minutes or more, the reasonably high quantum yield is nevertheless maintained.

EXAMPLE V

To select good decelerators the following procedure is employed.

About 5 mg of test material is placed in a 20 × 150 mm test tube along with a ½-inch magnetic stirring bar. A chemiluminescent reaction of 1 × $10^{-2}$M dinitrophenyl oxalate, 6.4 × $10^{-4}$M diphenylanthracene, and 2 × $10^{-2}$M $H_2O_2$ in dimethyl phthalate is started and a 10 ml aliquot of this chemiluminescent solution is placed in the test tube and the tube is stoppered. Time is measured from the addition of $H_2O_2$ to the chemiluminescent solution. The brightness of the test system is measured with a spectral brightness meter at selected intervals and the readings obtained compared to those obtained from the similar chemiluminescent reaction containing no additive. The results in terms of foot lamberts at 5, 21, 70, and 132 minutes from the start of the reaction are illustrated for different additives in the following Table V.

TABLE V

| Additive | Time from Reaction Start (min.) | | | |
|---|---|---|---|---|
| | 5 | 21 | 70 | 132 |

| Experiment | Additive | Additive (×10³) | $I_{(max.)}$ (foot lambert) | $t_{1/4}$ (min) | $t_{3/4}$ (min) | Quantum Yield 10² einstein mole⁻¹ |
|---|---|---|---|---|---|---|
| None (Control) | | | 0.48 | 0.20 | 0.06 | 0.009 |
| | $Cl_2CHCOH$ (with C=O) | | 0.03 | 0.03 | 0.05 | 0.025 |
| | lactic acid (85%) | | 0.15 | 0.07 | 0.044 | 0.019 |
| | adipic acid | | 0.39 | 0.12 | 0.067 | 0.012 |
| | malonic acid | | 0.14 | 0.09 | 0.044 | 0.022 |
| | malic acid | | no light was observed | | | |
| | 2,3-butanedione | | 0.25 | 0.15 | 0.037 | 0.008 |
| | $AlCl_3$ | | no light was observed | | | |
| | $Al_2(SO_4)_3$ | | 0.21 | 0.14 | 0.078 | 0.035 |
| | $BaCl_2$ | | 0.41 | 0.18 | 0.070 | 0.015 |
| | $Na_2SO_4$ | | 0.31 | 0.18 | 0.073 | 0.020 |
| | $ZnCl_2$ | | no light was observed | | | |
| | $ZnSO_4$ | | 0.23 | 0.11 | 0.035 | 0.015 |
| | $K_2SO_4$ | | 0.46 | 0.27 | 0.041 | 0.005 |
| | $Li_2SO_4$ | | 0.27 | 0.19 | 0.075 | 0.013 |
| | $LiNO_3$ | | 0.19 | 0.15 | 0.031 | 0.008 |
| | citric acid | | 0.49 | 0.18 | 0.050 | 0.009 |
| | nicotinic acid | | 0.17 | 0.02 | – | – |

From the above Table V it is seen that dichloro acetic acid is an effective decelerator whereas the trichloro acetic acid completely kills the chemiluminescent reaction and whereas the acetic acid shown in previous Table III has no effect whatsoever on the reaction. Lactic Acid, adipic acid, malonic acid, 2,3-butanedione, aluminum sulfate, barium chloride, sodium sulfate, zinc sulfate, and calcium sulfate are all lifetime extenders. Malic acid and zinc chloride kill the chemiluminescent reaction.

The Table V also illustrates that lithium sulfate is a satisfactory extender of lifetime.

Table V indicates that lithium nitrate and nicotinic acid decrease the light output of the chemiluminescent reaction.

Table V also illustrates that itric acid has no apparent effect on the chemiluminescent reaction under the conditions studied.

As set forth in the copending application, Ser. No. 577,595, lithium chloride is an accelerator of the chemiluminescent reaction.

EXAMPLE VI

In this example, an additional group of compounds, representing acids and acidic materials, were tested as decelerators using a chemiluminescent system of $1 \times 10^{-2}$ M bis(2,4-dinitrophenyl)oxalate, $1 \times 10^{-3}$ M 9,10-bis(phenylethynyl)anthracene (as a fluorescer) and $2 \times 10^{-2}$ M $H_2O_2$ in dimethyl phthalate at 25° C. The results are shown in Table VI, which illustrates the effectiveness of acids and acidic materials as decelerators for the chemiluminescent reaction.

TABLE VI

Study of Lifetime Extenders

Reactions with $1 \times 10^{-2}$ M bis(2,4-dinitrophenyl)oxalate (DNPO), $1 \times 10^{-3}$ M 9,10-bis(phenylethynyl)anthracene (BPEA), and $2 \times 10^{-2}$ M $H_2O_2$ in dimethyl phthalate (DMP) at 25° C.

Part A

Age of DNPO solution 18 hours or less

| | | Additive | $I_{max}$ | T¼ | T¾L | Quantum Yield |
|---|---|---|---|---|---|---|
| 1 | None | — | 131.0 | 0.9 | 2.3 | 7.8 |
| 2 | $C_6H_4COOH$ | 5.0 | 138.4 | 1.1 | 1.9 | 9.0 |
| 3 | $C_6H_4COOH$ | 50.0 | 100.7 | 1.6 | 2.1 | 8.5 |
| 4 | Acidic Alumina | 30 mgᵃ | 70.6 | 1.8 | 4.6 | 8.5 |
| 5 | $MgSO_4$ | 18 mgᵃ | 17.9 | 5.6 | 16.6 | 7.3 |
| 6 | $H_3PO_4$ | 0.01 | 18.1 | 5.6 | 14.6 | 6.3 |
| 7 | methanesulfonic acid | 0.01 | 14.0 | 9.5 | 14.0 | 7.1 |
| 8 | $H_2SO_4$ | 0.01 | 0.9 | 23.6 | 340.5 | 4.0 |

PART B

Age of DNPO solution 24-30 hours

| | | Additive | $I_{max}$ | T¼ | T¾L | Quantum Yield |
|---|---|---|---|---|---|---|
| 9 | None | — | 87.5 | 1.3 | 1.9 | 6.6 |
| 10 | O—$ClC_6H_4COOH$ | 5.0 | 95.5 | 1.2 | 2.0 | 6.7 |
| 11 | O—$ClC_6H_4COOH$ | 100.0ᵇ | 45.0 | 2.6 | 2.3 | 6.9 |
| 12 | Dowex 50 resinᶜ | 3 mgᵃ | 81.3 | 1.4 | 2.3 | 6.7 |
| 13 | O—$C_6H_4(COOH)_2$ | 25 mgᵃ | 7.9 | 11.6 | 9.3 | 4.5 |

ᵃThe additive was essentially insoluble
ᵇFor this reaction only: DNPO = $8.75 \times 10^{-3}$ M, and BPEA = $8.75 \times 10^{-4}$ M
ᶜDow Chemical Company

EXAMPLE VII 25 ml of a solution of 0.01 M bis(2,4-dinitrophenyl)oxalate, 0.02 M hydrogen peroxide, and $6 \times 10^{-4}$ M rubrene in dimethyl phthalate was treated with 25 ml of glacial acetic acid. The initially bright chemiluminescent emission from the solution abruptly decreased in intensity to about one-fourth of the initial upon addition of the acetic acid. The emission lifetime of the treated solution, however, exceeded 10 minutes and was thus substantially longer than the 1-2 minute lifetime obtained from the same system without the acid addition. Thus even a weak acid (acetic acid has a pKa of 4.75) can be an effective lifetime extender when high concentrations are used.

EXAMPLE VIII

In this example, the effect of oxalic acid was determined on the lifetime of a chemiluminescent system using bis(2,4-dinitro-6-methylphenyl)oxalate as the chemiluminescent compound. The results are shown in Table VII.

TABLE VII

Effect of Oxalic Acid on bis(2,4-dinitro-6-methylphenyl)oxalate (DNMPO) Chemiluminescenceᵃ

| Oxalic Acid (M) | $I_{max}$ᵇ (ft.lamberts) | T¼ᶜ (min.) | T¾Lᵈ (min.) | Quantum Yieldᵉ (einsteins mole⁻¹ × 10²) |
|---|---|---|---|---|
| None | 100.0 | 1.2 | 0.8 | 5.8 |
| $6.7 \times 10^{-1}$ | 12.9 | 16.3 | 11.6 | 9.31 |

ᵃReactions of 0.01 M DNMPO, 0.025 M $H_2O_2$, and $6.0 \times 10^{-4}$ M rubrene in 50% benzene — 50% dimethyl phthalate (by volume) at 25° C.
ᵇMaximum chemiluminescent brightness measured in a 1 cm thick cell.
ᶜThe time required for the light intensity to decay to one-quarter its maximum value.
ᵈThe time required for the emission of three-quarters of the total light.
ᵉBased on oxalate ester.

EXAMPLE IX

Experiments showing the effects of several alkali metal salts on chemiluminescence from bis(pentachlorophenyl)oxalate were conducted and the conditions and results are summarized in Table VIII. It is apparent that lithium, sodium, and rubidium chlorides and potassium sulfate accelerate the reaction, while lithium sulfate extends the T ¼ lifetime. All of these alkali salts increase the light yields.

TABLE VIII

Study of Chemiluminescence Accelerators[a]

| Additive | Amount added mg | $I_{max}$[b] (ft. lambert) | t ¼ I (min)[c] | t ¾ A (min)[d] | Quantum Yield (einsteins Mole$^{-1}$×10$^2$) |
|---|---|---|---|---|---|
| None | — | 0.21 | 216.28 | 484.92 | 2.63 |
| RbCl | 18.1 | 10.09 | 26.38 | 18.30 | 12.45 |
| NaCl | 8.8 | 1.46 | 116.00 | 220.56 | 10.73 |
| LiCl | 6.4 | 18.01 | 12.41 | 16.08 | 10.91 |
| K$_2$SO$_4$ | 26.1 | 1.59 | 134.22 | 196.18 | 11.86 |
| Li$_2$SO$_4$·H$_2$O | 19.2 | 0.51 | 306.10 | 306.18 | 8.72 |

[a]Reactions with 0.010 M bis(pentachlorohenyl)oxalate, 0.0010 M 9,10-bis(phenylethynyl)anthracene and 0.020 M H$_2$O$_2$ in 50% o-dichlorobenzene ethyl benzoate at 25°C.
[b]Maximum intensity at 1.0 cm thickener.
[c]Time required for intensity to decay to ¼ of the maximum intensity.
[d]Time required for ¾ of total light emission.

EXAMPLE X

Experiments with tartaric acid-tetrabutyl-ammonium tartarate buffer systems are summarized in Table IX. Lifetimes increase with increasing tartaric acid and decrease with increasing tartarate. It is evident that any specific lifetime within a broad range may be obtained by selecting the appropriate concentrations of tartaric acid and tartarate. It is found convenient to obtain the desired tartarate concentration by neutralizing a portion of the tartaric acid in the system with a strong base.

TABLE IX

Lifetime and Intensity Control with tartaric acid [TA]-tetra-butylammonium tartarate [BAT] Buffers[a]

| TA (m×10$^3$) | BAT (m×10$^3$) | maximum[b] intensity (ft. lamberts) | lifetimes(min.) $T_{1/4}$[c] | $T_{3/4}$[d] | Quantum Yield[e] (10$^2$einstein mole$^{-1}$) | Light Capacity (lumen hrs. liter$^{-1}$) |
|---|---|---|---|---|---|---|
| 3 | 1.7 | 16.6 | 29 | 40 | 6.4 | 56 |
| 3 | 5.0 | 13.0 | 2 | 4 | 0.5 | 4 |
| 10 | 3.3 | 11.0 | 16 | 23 | 3.0 | 26 |
| 15 | 1.7 | 10.5 | 48 | 74 | 7.6 | 66 |

[a]Reaction of 0.030 bis(2,4,6-trichlorophenyl)oxalate (TCPO), 0.10m hydrogen peroxide, 0.0020 m 9,10-bis(phenylethynyl)-anthracene in 9:1 (by volume) ethyl benzoate-t-butylalcohol
[b]Measured at a 1.0 cm thickness
[c]Time the intensity remained above ¼ of the maximum intensity
[d]Time required for ¾ of total light emission
[e]Based on TCPO It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus or article such as a container which, for example, may be (1) a substantially or (2) a dissolvable or (3) a frangible capsule in which the reactant or composition of this invention is substantially enclosed for subsequent reaction with other ingredients necessary to produce chemiluminescent light. Also it is within the scope of this invention to employ the composition and the process of this invention in combination with other systems and additives as disclosed.

We claim:

1. A chemiluminescent composition having improved lifetime, containing the ingredients (1) a lifetime extender agent from the following group:
   1. acids, the negative log of the pka thereof being below about 5.0 in aqueous solutions;
   2. sulfates of lithium and metals of Groups 2a, 2b, and 3a of the Periodic Table;
   3. chlorides of metals of Groups 2a of the Periodic Table;
   4. silica; and
   5. acidic ion exchange resins; (2) an ester represented by the formula:

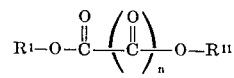

where R$^1$ and R$^{11}$ are each selected from the group consisting of aryl groups, heterocyclic groups, and unsaturated alkyl groups having vinyl unsaturation, and $n$ is a number at least 1, (3) an organic fluorescent compound, and (4) an organic solvent, said composition being intended to be reacted with a hydroperoxide, the proportions being such as to obtain a chemiluminescent emission of improved lifetime.

2. The composition of claim 1 wherein said lifetime extender is an acid, the negative log of the pka thereof being below about 3.2.

3. A component according to claim 1, in which said ester is one with a Hammett sigma constant greater than 0.

4. A composition according to claim 3 where the hydroperoxide is hydrogen peroxide.

5. A composition according to claim 3 in which said ester is bis(2,4,6-trichlorophenyl)oxylate.

6. A composition according to claim 4 in which the lifetime extender agent comprises oxalic acid, in which the aryl oxalic ester comprises bis(2,4-dinitrophenyl) oxalate, and in which the fluorescent compound comprises rubrene.

7. A composition according to claim 4 wherein said lifetime extender agent is magnesium sulfate.

8. A composition according to claim 4 wherein said lifetime extender agent is silica.

9. A composition according to claim 4 comprising in addition a base.

10. A chemiluminescent process for obtaining increased light lifetime comprising reacting together the ingredients of a composition according to Claim 1; said ingredients comprising said ester, a hydroperoxide, at least one organic fluorescent compound, and an organic solvent, in the presence of said lifetime extender agent.

11. A process according to claim 10 in which said lifetime extender agent comprises oxalic acid, in which said fluorescent compound comprises rubrene, in which said ester comprises an electronegatively substituted aryl oxalate ester, in which said organic solvent comprises dimethyl phthalate, and in which said hydroperoxide comprises hydrogen peroxide.

* * * * *